(12) United States Patent
Bhirud et al.

(10) Patent No.: US 10,471,881 B2
(45) Date of Patent: Nov. 12, 2019

(54) DEPLOYABLE CARGO ORGANIZER FOR USE IN THE CARGO AREA OF A VEHICLE

(71) Applicant: GM Global Technology Operations LLC, Detroit, MI (US)

(72) Inventors: Milind T. Bhirud, Troy, MI (US); Timothy Oselett, St. Clair Shores, MI (US); Jesse S. Roberts, Capac, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/860,020

(22) Filed: Jan. 2, 2018

(65) Prior Publication Data

US 2019/0202334 A1 Jul. 4, 2019

(51) Int. Cl.
*B60P 7/14* (2006.01)
*B60R 13/01* (2006.01)
*B60R 7/02* (2006.01)

(52) U.S. Cl.
CPC .............. *B60P 7/14* (2013.01); *B60R 7/02* (2013.01); *B60R 13/013* (2013.01)

(58) Field of Classification Search
CPC ..... B60R 13/01; B60R 13/011; B60R 13/013; B60R 2013/015; B60R 2013/018; B60R 5/04; B60R 7/02; B60R 2011/0029; B60R 2011/0036; B60P 7/14
USPC ................ 296/24.4, 37.5, 37.6, 37.14, 37.16
See application file for complete search history.

(56) References Cited

U.S. PATENT DOCUMENTS

| | | | | |
|---|---|---|---|---|
| 5,080,417 A * | 1/1992 | Kanai | ....... | B60R 5/04 296/37.14 |
| 5,769,294 A * | 6/1998 | Heinz | ....... | B60R 7/02 224/544 |
| 6,155,625 A * | 12/2000 | Felix | ....... | B60R 9/00 296/37.1 |
| 6,247,741 B1 * | 6/2001 | Seel | ....... | B60R 5/00 296/37.14 |
| 6,851,735 B2 * | 2/2005 | Hicks | ....... | B60R 7/02 224/281 |
| 7,066,516 B2 * | 6/2006 | Mulvihill | ....... | B60R 7/02 296/24.4 |
| 2002/0014777 A1 * | 2/2002 | Gehring | ....... | B60R 7/02 296/37.5 |
| 2002/0070574 A1 * | 6/2002 | Carlsson | ....... | B60R 5/04 296/37.14 |

(Continued)

FOREIGN PATENT DOCUMENTS

DE 4340675 * 6/1995 ............. B60N 3/001

*Primary Examiner* — Gregory A Blankenship

(57) ABSTRACT

A cargo organizer for use on a load floor of a vehicle includes a first divider wall rotatably connected to the load floor and a second divider wall rotatably connected to the load floor and spaced apart from the first divider wall to define at least one storage compartment. The first divider wall and the second divider wall are configured to operate in a stowed position and in a deployed position. The cargo organizer also includes a linkage mechanism connected to the first divider wall and the second divider wall. The linkage mechanism is configured to move the first divider wall and the second divider wall from the stowed position to the deployed position when one of the first divider wall and the second divider wall is moved from the stowed position to the deployed position.

17 Claims, 5 Drawing Sheets

(56) References Cited

U.S. PATENT DOCUMENTS

| | | | |
|---|---|---|---|
| 2004/0056058 A1* | 3/2004 | Ryan | B60R 7/02 224/498 |
| 2004/0135390 A1* | 7/2004 | Gammon | B60R 5/04 296/37.1 |
| 2006/0022479 A1* | 2/2006 | Mulvihill | B60R 7/02 296/37.16 |
| 2007/0257501 A1* | 11/2007 | Smith | B60R 11/00 296/37.6 |
| 2010/0270821 A1* | 10/2010 | Ulita | B60R 5/04 296/37.14 |
| 2011/0074175 A1* | 3/2011 | Mahaffy | B60R 9/00 296/37.6 |
| 2015/0175080 A1* | 6/2015 | Kmita | B60R 7/02 296/37.5 |
| 2016/0144800 A1* | 5/2016 | Henderson | B60R 13/013 296/24.4 |
| 2016/0152194 A1* | 6/2016 | Kim | B60R 13/01 296/37.5 |
| 2016/0214539 A1* | 7/2016 | Huebner | B60R 5/04 |

* cited by examiner

DEPLOYABLE CARGO ORGANIZER FOR USE IN THE CARGO AREA OF A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a deployable cargo organizer for use in the cargo area of a vehicle.

Vehicles typically include an area that can be used to transport various types of cargo. Such cargo areas can have multiple types of configurations such as a load floor in a sport utility, cross-over or hatchback vehicle or a trunk in a sedan. In these types of cargo areas and in others, the floor of the cargo areas can be a large planar area that is often used to store and/or transport various items such as groceries, luggage, sports equipment, tools, bags, household goods, briefcases, office supplies, child care items, toys, other purchases and the like.

The cargo areas of vehicles can include a load floor that covers the sheet metal or other support structure of the cargo area. A load floor can include one or more layers of material that shape the load floor to fit within the cargo area and create an aesthetically pleasing appearance.

SUMMARY

In one example in accordance with the present disclosure, a cargo organizer for use on a load floor of a vehicle includes a first divider wall rotatably connected to the load floor and a second divider wall rotatably connected to the load floor and spaced apart from the first divider wall to define at least one storage compartment. The first divider wall and the second divider wall are configured to operate in a stowed position and in a deployed position. The cargo organizer also includes a linkage mechanism connected to the first divider wall and the second divider wall. The linkage mechanism is configured to move the first divider wall and the second divider wall from the stowed position to the deployed position when one of the first divider wall and the second divider wall is moved from the stowed position to the deployed position.

In one aspect, the linkage mechanism includes a first side linkage and a second side linkage. The first side linkage is connected to a first side on the first divider wall and the second divider wall. The second side linkage is connected to a second side of the first divider wall and the second divider wall, wherein the first side and the second side are located opposite one another on the first divider wall and the second divider wall.

In one aspect, the first divider wall and the second divider wall are positioned horizontally when in the stowed position and vertically when in the deployed position.

In one aspect, the first side linkage includes at least one rigid member connected to the first divider wall and the second divider wall.

In one aspect, the first divider wall includes a pin projecting outward therefrom. The pin rotatably connects the first divider wall to the linkage mechanism.

In one aspect, the first divider wall is connected to the linkage mechanism by a fastener inserted through the linkage mechanism into the pin on the first divider wall.

In one aspect, the first divider wall and the second divider wall have a thickness that is less than a height of a recessed portion in the load floor such that the first divider wall and the second divider wall do not project above a load surface of the load floor when the first divider wall and the second divider wall are in the stowed position.

In one aspect, the first divider wall and the second divider wall include a trim layer positioned on a back surface of the first divider wall and the second divider wall. The trim layer faces upwards from the load floor when the first divider wall and the second divider wall are in the stowed position. The trim layer comprises a fabric material that is the same as a fabric material on the load floor.

In one aspect, the cargo organizer further includes a hinge. The hinge is connected to the load floor and includes a shaft that is received in a sleeve in the first divider wall. The shaft rotatably connects the first divider wall to the load floor.

In one aspect, the cargo organizer further includes a net. The net is connected to the linkage mechanism with a plurality of tethers and extends between the first divider wall and the second divider wall to limit movement of items stored in the storage compartment.

In one aspect, the cargo organizer further includes a rigid support leg. The rigid support leg extends between the load floor and the first divider wall. The rigid support leg is configured to prevent the first divider wall from moving from the deployed position to the stowed position.

In one aspect, the support leg is an elongated bar rotatably connected to the load floor and removably connected to the first divider wall at a vertical location on a side wall of the first divider wall below the linkage mechanism.

In one aspect, the first divider wall includes a retention ring. The retention ring is connected to the first divider wall in the storage compartment and is configured to move from a folded position to an extended position to retain an item in the storage compartment.

In one aspect, the cargo organizer further includes a third divider wall rotatably connected to the load floor and spaced apart from the second divider wall to define a second storage compartment. The linkage mechanism is connected to the first divider wall, the second divider wall and the third divider wall to move the first divider wall, the second divider wall and the third divider wall from the stowed position to the deployed position when one of the first divider wall, the second divider wall and the third divider wall is moved from the stowed position to the deployed position.

In one aspect, the first divider wall includes a sleeve molded in a lower portion thereof. The sleeve is configured to receive a shaft of a hinge mounted on the load floor to rotatably connect the first divider wall to the load floor.

In one aspect, the first divider wall includes at least one hook positioned in the storage compartment. The hook is configured to limit movement of a bag secured thereon in the storage compartment.

In one aspect, a load floor is configured to lay horizontally in a cargo area of a vehicle and includes the cargo organizer.

In aspect, the load floor includes a recessed portion wherein the cargo organizer is connected inside the recessed portion.

In one aspect, a load floor is configured to lay horizontally in a cargo area of a vehicle. The load floor includes two cargo organizers positioned adjacent to one another.

In another example in accordance with the present disclosure, a cargo organizer for use in a cargo area of a vehicle includes a cargo floor configured to be positioned horizontally in the cargo area of the vehicle. The cargo floor includes a load surface facing upwards in the cargo area and a first side wall, a second side wall, a first end wall, a second end wall and a base. The first end wall and the second end wall connect the first side wall to the second side wall with the base therebetween. The base is vertically offset from the load surface such that the first side wall, the second side wall, the first end wall, the second end wall and the base define a rectangular depression. The cargo organizer also includes a first divider wall rotatably connected to the first side wall and the second side wall inside the rectangular depression. The first divider wall is operable in a stowed position and in a deployed position. The first divider wall is positioned parallel to the base of the rectangular depression when in the stowed position and the first divider wall is positioned vertically when in the deployed position. The cargo organizer also includes a second divider wall rotatably connected to the first side wall and the second side wall inside the rectangular depression such that the second divider wall is spaced apart from the first divider wall. The second divider wall is operable in the stowed position and in the deployed position. The second divider wall is positioned parallel to the base of the rectangular depression when in the stowed position and the second divider wall is positioned vertically when in the deployed position. The cargo organizer also includes a rigid link connected to the first divider wall and the second divider wall. The rigid link is configured to cause the first divider wall to move together with the second divider wall from the stowed position to the deployed position.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

In one example in accordance with the present disclosure, a cargo organizer is connected to a load floor for use in the cargo area of a vehicle. The example cargo organizer includes one or more divider walls that can operate in a stowed position or in a deployed position. The divider walls are connected to a recessed portion in the load floor such that the divider walls are positioned at or below a loading surface of the load floor when the divider walls are in the stowed position. The divider walls can be moved from the stowed position to the deployed position wherein the divider walls are positioned orthogonally to the load floor to define separate compartments between the divider walls. In the deployed position, various items can be stored or transported in the compartments between the divider walls to limit the movement of such items.

The divider walls of the example cargo organizer are connected to one another so that more than one divider wall moves from the stowed position to the deployed position together. The example cargo organizer is connected to the load floor using integrated hinges to permit the one or more divider walls to easily rotate from the stowed position to the deployed position.

Figure 1:
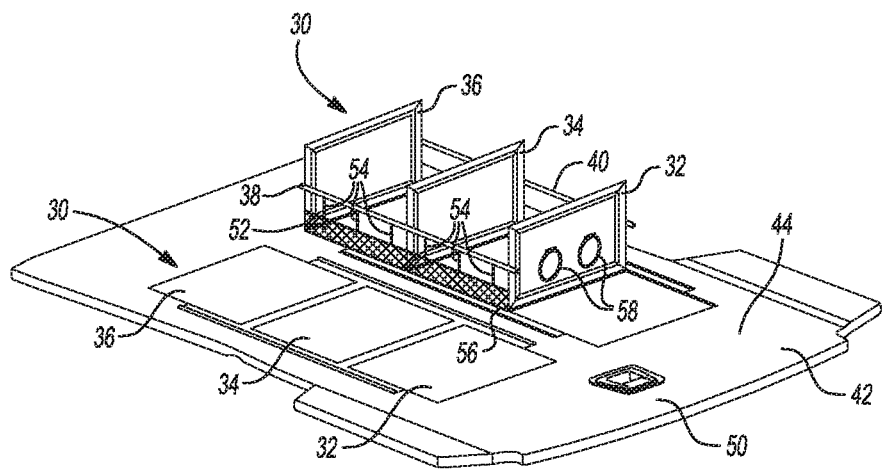
FIG. 1 is a perspective view of an example load floor of the present disclosure with a first example cargo organizer in a deployed position and a second example cargo organizer in a stowed position.

Referring now to FIG. 1, the example cargo organizer 30 includes a first divider wall 32, a second divider wall 34, a third divider wall 36, a first linkage 38 and a second linkage 40. The cargo organizer 30 is positioned on a load floor 42. The load floor 42 is sized to fit inside a cargo area of a vehicle. In the example shown, the load floor 42 is sized to fit inside the cargo area of a sport utility vehicle or crossover vehicle. In other examples, the cargo organizer 30 can be positioned on other shapes and profiles of other load floors 42. For example, the cargo organizer 30 can be positioned on a load floor 42 that is used in the cargo area of a hatchback vehicle or in the trunk of a sedan. Still further, the cargo organizer 30 can be used in other applications other than vehicles. The cargo organizer 30 can be used on trailers, shopping carts, wagons or other transportation devices as well.

The load floor 42 shown in FIG. 1 includes two cargo organizers 30. As shown, a first cargo organizer 30 is shown in the deployed position and a second cargo organizer 30 is shown in the stowed position. As will be described in more detail below, the first divider wall 32, the second divider wall 34 and the third divider wall 36 are positioned perpendicularly to a load surface 44 of the load floor 42 when the cargo organizer 30 is in the deployed position. When the cargo organizer 30 is in the stowed position, the first divider wall 32, the second divider wall 34 and the third divider wall 36 are positioned parallel to the load surface 44 of the load floor 42.

The first divider wall 32, the second divider wall 34 and the third divider wall 36, in this example, have the same profile and shape. The first divider wall 32, the second divider wall 34 and the third divider wall 36 are rectangular members. In other examples, the first divider wall 32, the second divider wall 34 and the third divider wall 36 can have other shapes. The first divider wall 32, the second divider wall 34 and the third divider wall 36 can be made of any suitable material. In this example, the first divider wall 32, the second divider wall 34 and the third divider wall 36 are formed of a plastic material. In other examples, other natural and synthetic materials can also be used such as metals, woods, plastics or composites.

The first divider wall 32, the second divider wall 34 and the third divider wall 36, in the example shown, are connected to one another by the first linkage 38 and the second linkage 40. The first linkage 38 is connected along inboard sides of the first divider wall 32, the second divider wall 34 and the third divider wall 36. The second linkage 40, in this example, is similar to the first linkage 38 but is connected to the first divider wall 32, the second divider wall 34 and the third divider wall 36 along outboard sides of the first divider wall 32, the second divider wall 34 and the third divider wall 36.

The first linkage 38 and the second linkage 40, in one example as shown, are elongated bars that connect to each of the first divider wall 32, the second divider wall 34 and the third divider wall 36. The first linkage 38 and the second linkage 40 can be connected to the first divider wall 32, the second divider wall 34 and the third divider wall 36 using a fastener such as a screw, rivet, bolt or the like. Alternatively, the first linkage 38 and the second linkage 40 can include holes spaced apart from one another that align with the sides of the first divider wall 32, the second divider wall 34 and the third divider wall 36. The first divider wall 32, the second divider wall 34 and the third divider wall 36 can include pins or other rounded members that are received into the holes on the first linkage 38 and the second linkage 40 to secure the first linkage 38 and the second linkage 40 to the first divider wall 32, the second divider wall 34 and the third divider wall 36. In still other examples, other types of attachment interfaces can be used to connect the first linkage 38 and the second linkage 40 to the first divider wall 32, the second divider wall 34 and the third divider wall 36.

Regardless of the attachment type used at the connection of the first linkage 38 and the second linkage 40 to the first divider wall 32, the second divider wall 34 and the third divider wall 36, the first linkage 38 and the second linkage 40 can rotate relative to the first divider wall 32, the second divider wall 34 and the third divider wall 36. Such rotation enables the first linkage 38 and the second linkage 40 to cause the first divider wall 32, the second divider wall 34 and the third divider wall 36 to move together from the stowed position to the deployed position.

When one of the first divider wall 32, the second divider wall 34 and the third divider wall 36 is moved from the stowed position to the deployed position by rotating the first divider wall 32, the second divider wall 34 or the third divider wall 36 upwards from the load floor 42, the first linkage 38 and the second linkage 40 cause the remaining divider walls to rotate upward from the load floor in a coordinated manner. This makes the movement of the cargo organizer 30 from the stowed position to the deployed position an easy and quick process. As can be appreciated in the example shown, the third divider wall 36 is located away from a rear portion 50 of the load floor 42 such that an individual accessing a cargo area in which the load floor 42 is located would have a difficult time reaching the third divider wall 36. Because the first divider wall 32, the second divider wall 34 and the third divider wall 36 are connected by the first linkage 38 and the second linkage 40, the individual using the cargo organizer 30 only needs to reach the first divider wall 32 in order to deploy all three of the first divider wall 32, the second divider wall 34 and the third divider wall 36.

In the example shown, the first linkage 38 and the second linkage 40 are rectangular bars of material with lengths permitting the first linkage 38 and the second linkage 40 to connect the first divider wall 32, the second divider wall 34 and the third divider wall 36. In other examples, the first linkage 38 and/or the second linkage 40 include two or more separate links that connect the first divider wall 32, the second divider wall 34 and the third divider wall 36. For example, the first linkage 38 and/or the second linkage can include a first bar that connects the first divider wall 32 to the second divider wall 34 and a second bar that connects the second divider wall 34 to the third divider wall 36.

Figure 2:
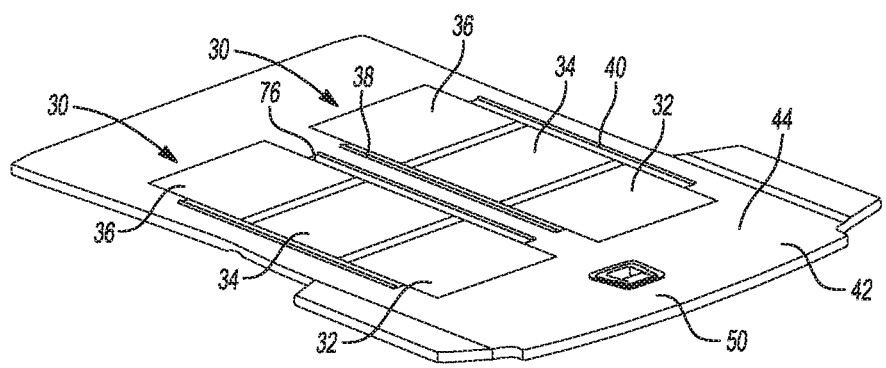
FIG. 2 is a perspective view of the load floor of FIG. 1 in which both example cargo organizers are in the stowed position.

As shown in FIG. 2, the cargo organizer 30 is in the stowed position. In the stowed position, the first divider wall 32, the second divider wall 34 and the third divider wall 36 are positioned parallel and flat against the load floor 42. As will be further described below, the load floor 42 can include a recessed portion or depression that permits the first divider wall 32, the second divider wall 34 and the third divider wall 36 to fit flushly in the load floor 42 so that a back surface of the first divider wall 32, the second divider wall 34 and the third divider wall 36 are positioned flushly or vertically below the load surface 44 of the load floor 42. In such a position, larger items can be loaded (or unloaded) into or from the cargo area of the vehicle without being obstructed by the first divider wall 32, the second divider wall 34 and the third divider wall 36.

In the example load floor 42 shown in FIGS. 1 and 2, two cargo organizers 30 are positioned longitudinally side-by-side on the load floor 42. In other examples, the load floor 42 can include only one cargo organizer 30 or can include more than two cargo organizers 30. In other examples, the cargo organizers 30 can be oriented transversely across the load floor 42 as well.

Figure 3:
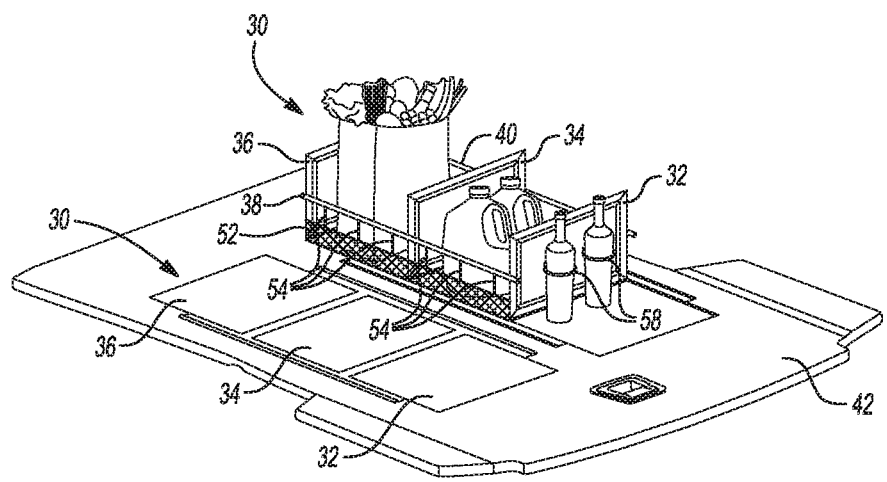
FIG. 3 is an illustration of the example load floor of FIG. 1 in which one example cargo organizer is in the deployed position with items deposited therein.

Referring now to FIG. 3, the cargo organizer 30 is shown in a deployed position with several items stored between the first divider wall 32, the second divider wall 34 and the third divider wall 36. As shown, the cargo organizer 30 can be sized to receive commonly transported items. In this example, the cargo organizer 30 is shown transporting several grocery items. To assist in retaining the items between the first divider wall 32, the second divider wall 34 and the third divider wall 36, the cargo organizer 30, in this example, includes a net 52. The net 52 is secured to the first linkage 38 using one or more tethers 54 and is secured to the load floor 42 at a bottom edge 56. The net 52 extends between the first divider wall 32, the second divider wall 34 and the third divider wall 36 in order to keep items between the first divider wall 32, the second divider wall 34 and the third divider wall 36.

As shown, the cargo organizer 30 can include retention features that also assist in keeping items in the cargo organizer 30. In the example shown, the first divider wall 32 includes two retention rings 58. The retention rings 58 are connected to the first divider wall 32 and can be operated in a folded position and in an extended position. In the folded position (as shown in FIG. 1), the retention rings 58 are folded flat against the first divider wall 32. In this position, the retention rings 58 permit the first divider wall 32 to be folded into the stowed position. In the extended position (as shown in FIG. 3), the retention rings 58 are extended outward from the first divider wall 32. In the extended position, bottles, cups, jars or other containers can be inserted into the retention rings 58 to prevent the item inserted in the retention ring 58 from moving inside cargo organizer 30. In other examples, the second divider wall 34 and/or the third divider wall 36 can include one or more retention rings 58. In addition, the retention rings 58 can have other shapes and have other size diameters in order that variously sized items can be retained by the retention rings 58.

While not shown, the first divider wall 32, the second divider wall 34 and the third divider wall 36 can include other retention features incorporated into or otherwise connected to the divider walls to limit the movement of items relative to the cargo organizer 30. Such other retention features can include hooks, elastic straps, pockets, tabs or the like. Such additional retention features or the retention features previously described can be used to retain various items in the cargo organizer 30 such as: milk jugs, milk cartons, grocery bags, beverage bottles, beverage bottle cartons, wine bottles, garden pots, flower bouquets, balls, melons, tool boxes, picnic baskets, coolers and the like.

Figure 4:
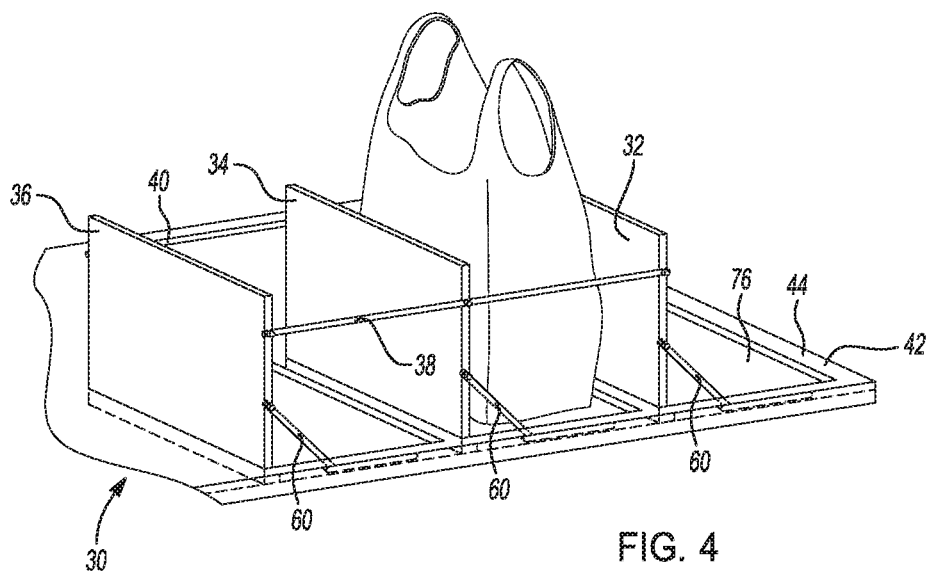
FIG. 4 is an illustration of another example cargo organizer of the present disclosure in the deployed position.

In another example shown in FIG. 4, the cargo organizer 30 can include one or more support legs 60. The support legs 60, in this example, are elongated bars that extend between the load floor 42 and the side edges of the first divider wall 32, the second divider wall 34 and the third divider wall 36. The support legs 60 connect to a pin or other connecting features at the side edges of the first divider wall 32, the second divider wall 34 and the third divider wall 36. The support legs 60 can connect to the first divider wall 32, the second divider wall 34 and the third divider wall 36 to support the cargo organizer in the deployed position as shown. When the support legs 60 are secured to the first divider wall 32, the second divider wall 34 and the third divider wall 36, the cargo organizer 30 is restrained from moving downwards to the stowed position unless the support legs 60 are detached from the first divider wall 32, the second divider wall 34 and the third divider wall 36.

The support legs 60 are connected at the load floor 42 with a pin or other connector that permits the support legs 60 to rotate. In this manner, the support legs 60 can rotate toward the load floor 42 and be concealed when the cargo organizer 30 is in the stowed position. The support legs 60 can also be rotated upwards from the load floor 42 and be connected to the first divider wall 32, the second divider wall 34 and the third divider wall 36 when the cargo organizer 30 is moved to the deployed position. The support legs 60 can include a C-shaped snap connection or other connector at the end of the support leg 60 that connects to the first divider wall 32, the second divider wall 34 or the third divider wall 36. In this manner, the support leg 60 can be removably connected to the first divider wall 32, the second divider wall 34 or the third divider wall 36 to alternate between the stowed and deployed positions with the cargo organizer 30.

In other examples of the cargo organizer 30, only one support leg 60 can be used in connection with the cargo organizer 30. As can be appreciated, if only one support leg 60 is used, it can be connected to the first divider wall 32, the second divider wall 34 or the third divider wall 36. A single support leg 60 can support all the divider walls in the deployed position since the first divider wall 32, the second divider wall 34 and the third divider wall 36 are connected to one another by the first linkage 38 and/or the second linkage 40.

Figure 5:
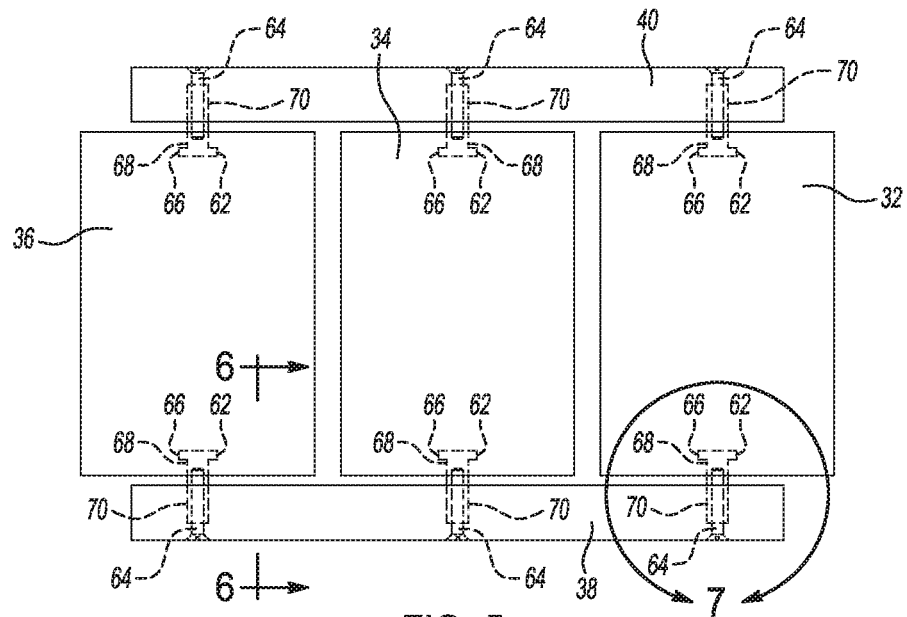
FIG. 5 is a top view of another example cargo organizer of the present disclosure showing a connection between the divider panels and the linkages.
Figure 6:
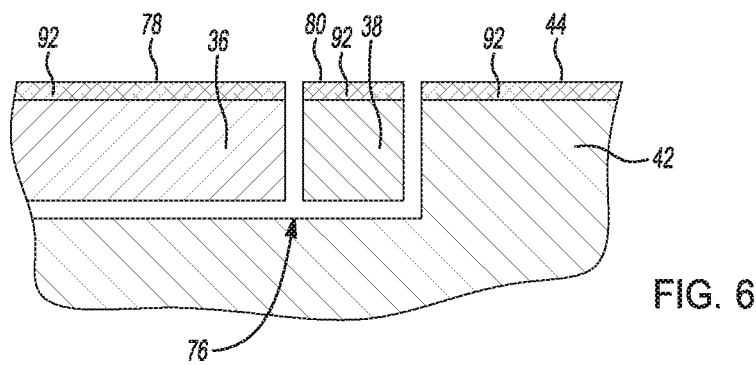
FIG. 6 is magnified cross-sectional rear view of the example cargo organizer of FIG. 5.
Figure 7:
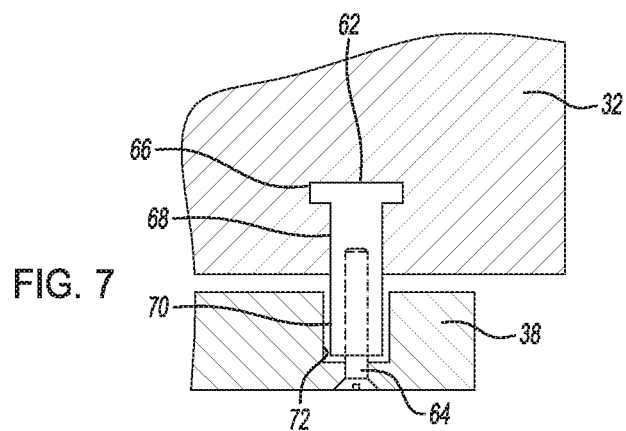
FIG. 7 is a magnified cross-sectional top view of the example cargo organizer of FIG. 5.

Referring now to FIGS. 5-7, one example of the first linkage 38 and the second linkage 40 is shown. In this example, the first linkage 38 and the second linkage 40 are connected to the first divider wall 32, the second divider wall 34 and the third divider wall 36 by pins 62 and fasteners 64. The pins 62 are cylindrical with a head portion 66 and a body portion 68. The head portion 66 has a diameter that is larger than the body portion 68. The pins 62 are positioned in the first divider wall 32, the second divider wall 34 and the third divider wall 36 such that distal ends 70 of the pins 62 project out from the sides of the first divider wall 32, the second divider wall 34 and the third divider wall 36.

The first linkage 38 and the second linkage 40, in the example shown, include circular openings 72. The openings 72 are spaced along the lengths of the first linkage 38 and the second linkage 40 and have inner diameters that are smaller than the outer diameters of the bodies of the pins 62. As such, the first linkage 38 and the second linkage 40 fit over the distal ends 70 of the pins 62 and permit the first linkage 38 and the second linkage 40 to rotate relative to the pins 62. The first linkage 38 and the second linkage 40 are secured to the pins 62 by securing the fasteners 64 through the first linkage 38 and the second linkage 40 and into the pins 62 as shown in FIGS. 5 and 7. As shown, the fasteners 64 are screws or bolts but in other examples other types of fasteners can be used such as rivets, push pins, clips and the like. In still other examples, the pins 62 can include fastening features integrated into the pins 62 that cause the pins 62 to be inserted into the openings 72 and be secured therein without the need for additional fasteners 64.

The pins 62 can be separate pieces that are co-molded into the first divider wall 32, the second divider wall 34 and/or the third divider wall 36. In other examples, the pins 62 can be molded as part of the first divider wall 32, the second divider wall 34 and/or the third divider wall 36. In still other examples, the pins 62 can be separate pieces that are screwed into or otherwise attached to the first divider wall 32, the second divider wall 34 and/or the third divider wall 36.

As shown in FIG. 6, the first linkage 38 and the third divider wall 36 have a thickness that is that is the same or less than a depth of a recessed portion 76 of the load floor 42. This relative sizing permits the first linkage 38 and the third divider wall 36 to be positioned with a back surface 78 of the third divider wall 36 and an top surface 80 of the first linkage to be aligned with or substantially co-planar with the load surface 44 of the load floor 42. The second linkage 40, the first divider wall 32 and the second divider wall 34 can be similarly configured so that the back surfaces 78 of the first divider wall 32 and the second divider wall 34 as well as the top surface 80 of the second linkage 40 are also aligned with or substantially co-planar with the load surface 44 of the load floor 42.

As further shown in FIG. 6, the first linkage 38, the third divider wall 36 and the load floor 42 can include a trim layer 92. The trim layer 92 is a layer of fabric, vinyl, leather, textured plastic or other surface material that is positioned on the upward-facing surfaces (i.e., the back surface 78, the top surface 80 and the load surface 44). The trim layer 92 is an aesthetically-pleasing surface layer that can be added to one or more of the first linkage 38, the third divider wall 36 and/or the load floor 42 to coordinate the appearances of these components when the cargo organizer 30 is in the stowed position. When stowed, the cargo organizer 30 would appear the same as the load floor 42 if the trim layer 92 is deposited on the upward-facing surfaces as shown and described. The trim layer 92 can be secured using adhesive, welding, staking or other suitable attachment method and can be secured to the second linkage 40, the first divider wall 32 and the second divider wall 34 as well.

Figure 8:
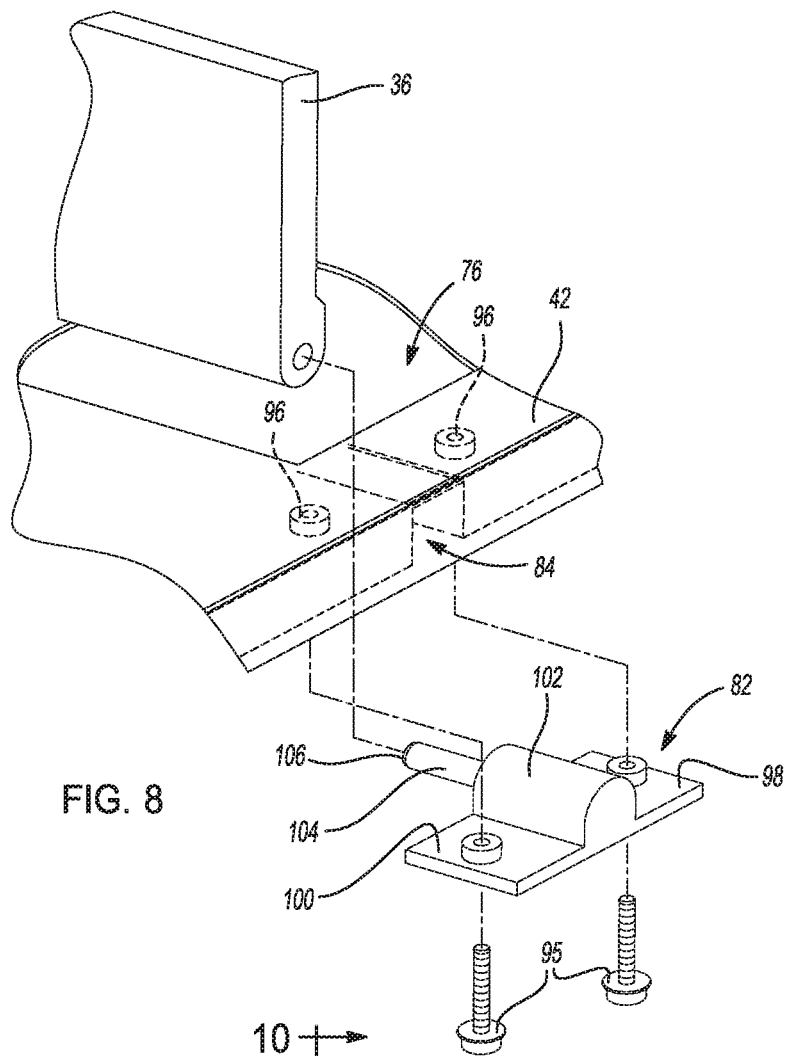
FIG. 8 is an exploded view of an example hinge portion of the cargo organizer of FIG. 4.
Figure 9:
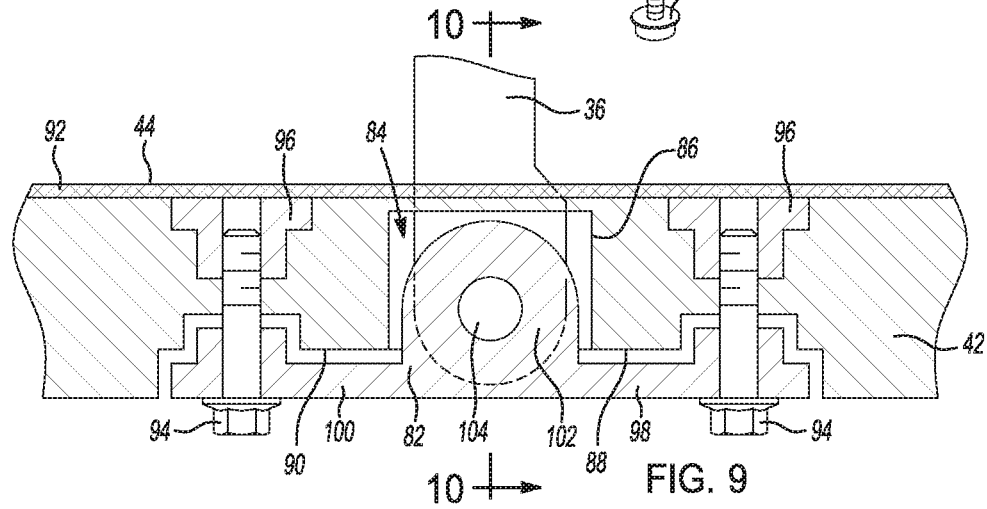
FIG. 9 is a cross-sectional side view of the example hinge portion of FIG. 8.
Figure 10:
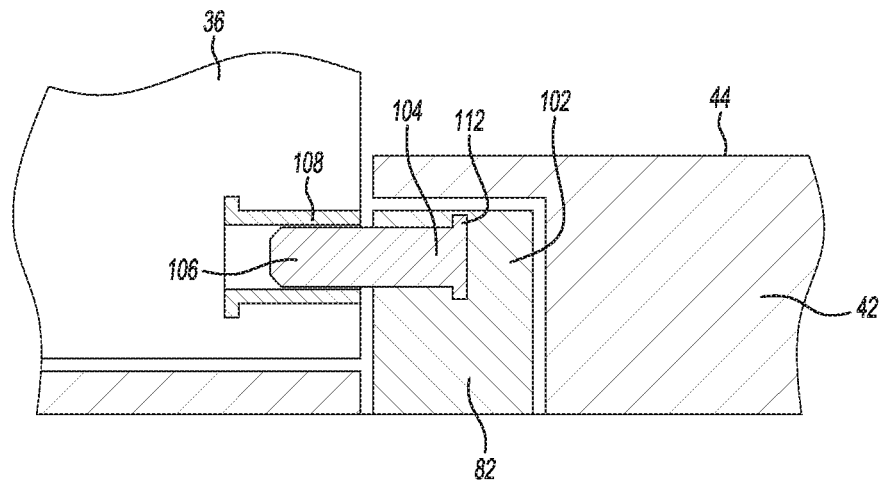
FIG. 10 is a cross-sectional rear view of the example hinge portion of FIG. 8.

As shown in FIGS. 8-10, the first divider wall 32, the second divider wall 34 and the third divider wall 36 are rotatably connected to the load floor 42 using a hinge 82. In the example shown, the third divider wall 36 is shown rotatably connected to the load floor 42. As can be appreciated, a similar hinge 82 can be used to rotatably connect the first divider wall 32 and the second divider wall 34 to the load floor 42 as well.

In the example shown, the load floor 42 includes a hinge chamber 84 that projects upward from a bottom of the load floor 42. The hinge chamber 84 is sized and otherwise configured to receive the hinge 82. The hinge chamber 84 includes a central portion 86 and first and second extension portions 88, 90. The central portion 86 has a height that is larger than the heights of the first and second extension portions 88, 90. The central portion 86 is in communication with the recessed portion 76 of the load floor 42 so that the hinge 82 (or a portion thereof) can project into the recessed portion 76 to engage the third divider wall 36 as will be further described.

The hinge 82, in the example shown, is a separate component that is inserted into the hinge chamber 84 and secured to the load floor 42 using hinge fasteners 94. As shown in FIG. 9, the load floor 42 can include complimentary fastening members 96 that are molded into or otherwise connected in the load floor 42 to permit the hinge 82 to be secured to the load floor 42 by securing the hinge fasteners through a first arm 98 and a second arm 100 of the hinge 82 and into the complimentary fastening members 96. The hinge fasteners 94 and the complimentary fastening members 96 can be any suitable fastener such as, bolts and nuts or the like.

The hinge 82 includes a core 102 that is positioned between the first arm 98 and the second arm 100. When the hinge 82 is received into the hinge chamber 84, the core 102 is positioned in the central portion 86 and the first and second arms 98, 100 are positioned in the first and second extension portions 88, 90, respectively. In the example shown, the core has a rounded profile that projects upward from the first and second arms 98, 100.

The hinge 82 also includes a shaft 104 that projects outward from the core 102. The shaft 104 projects outward from the core 102 and into the recessed portion 76 of the load floor 42 to engage the third divider wall 36. When engaged to the third divider wall 36, the third divider wall 36 can rotate about the shaft 104. The shaft 104 is an elongated cylindrical member that is molded into or otherwise secured in the core 102. The shaft 104, in the example shown, includes a lead-in end 106 with a chamfer or other feature to assist with installing the third divider wall 36 over the shaft 104. The shaft 104 also includes a head 112 that is an enlarged portion of the shaft at the end of the shaft 104 opposite to the head 112. The head 112 can assist to secure the shaft 104 in the core 102. In other examples of the hinge 82, the core 102 and/or the shaft 104 can have other shapes and be connected together using alternate fastening methods.

As shown in FIG. 10, the third divider wall 36 includes a sleeve 108. The sleeve 108 is a hollow cylindrical tube inside the third divider wall 36. The sleeve 108 is sized with an inner diameter larger than the outer diameter of the shaft 104 so that the sleeve 108 can be installed over the shaft 104 when the third divider wall 36 is installed with the hinge 82. The sleeve 108 can have a smooth inner surface to engage the shaft 104 and permit smooth operation of the cargo organizer 30. In one example the sleeve 108 and the shaft 104 are made of suitable metals. In other examples, the sleeve 108 and/or the shaft 104 can be made of other materials such as suitable plastics or composites.

As can be appreciated, the load floor 42 includes multiple hinge chambers 84 and multiple hinges 82 positioned on opposite sides of the first divider wall 32, the second divider wall 34 and the third divider wall 36. In this manner, the first divider wall 32, the second divider wall 34 and the third divider wall 36 are rotatably connected to the load floor 42 and can be moved from the stowed position to the deployed position as previously described.

Figure 11:
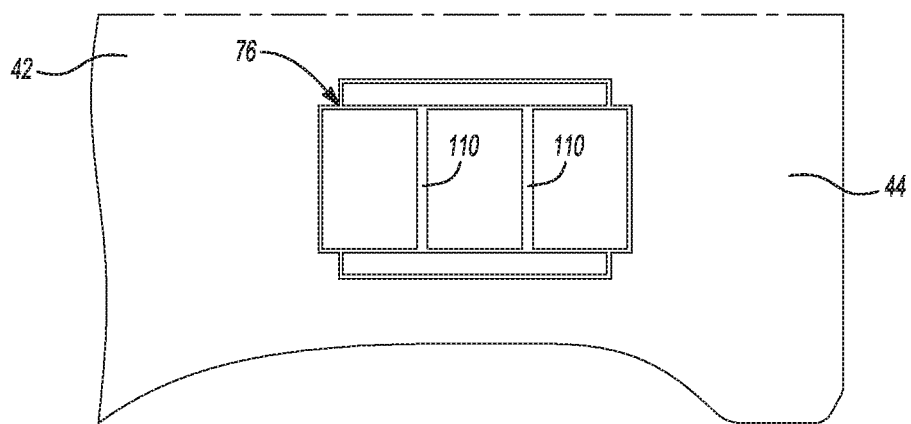
FIG. 11 is top view of an example load floor of the present disclosure showing a profile of a recessed portion.

In one example, the load floor 42 includes the recessed portion 76 as shown in FIG. 11. In this example, the recessed portion 76 is a depression in the load floor 42 that permits the first divider wall 32, the second divider wall 34, the third divider wall 36, the first linkage 38 and the second linkage 40 to be located at or below the load surface 44 of the load floor 42. In this example, the recessed portion 76 includes one or more rectangular depressions separated by the partitions 110. The rectangular depressions are sized to receive the first divider wall 32, the second divider wall 34, the third divider wall 36, the first linkage 38 and the second linkage 40. In other examples, the recessed portion 76 does not include the partitions 110 and the recessed portion is a recessed with an outer profile that follows the outer periphery of the cargo organizer 30 when the cargo organizer 30 is in the stowed position.

The load floor 42 can be provided with a vehicle as a feature of the cargo area. In other examples, the cargo organizer 30 and/or the load floor 42 with the cargo organizer 30 integrated into the load floor 42 can be provided as an accessory or as an after-market item to replace an existing load floor.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A cargo organizer for use on a load floor of a vehicle comprising:
    a first divider wall rotatably connected to the load floor;
    a second divider wall rotatably connected to the load floor and spaced apart from the first divider wall to define at least one storage compartment, the first divider wall and the second divider wall configured to operate in a stowed position and in a deployed position; and
    a linkage mechanism connected to the first divider wall and the second divider wall, the linkage mechanism configured to move the first divider wall and the second divider wall from the stowed position to the deployed position when one of the first divider wall and the second divider wall is moved from the stowed position to the deployed position,
    wherein the first divider wall includes a pin projecting outward therefrom,
    wherein the pin rotatably connects the first divider wall to the linkage mechanism, and
    wherein the first divider wall is connected to the linkage mechanism by a fastener that is inserted through the linkage mechanism into the pin on the first divider wall.

2. The cargo organizer of claim 1 wherein the linkage mechanism includes a first side linkage and a second side linkage, the first side linkage connected to a first side on the first divider wall and the second divider wall and the second side linkage connected to a second side of the first divider wall and the second divider wall, wherein the first side and the second side are located opposite one another on the first divider wall and the second divider wall.

3. The cargo organizer of claim 1 wherein the first divider wall and the second divider wall are positioned horizontally when in the stowed position and vertically when in the deployed position.

4. The cargo organizer of claim 2 wherein the first side linkage includes at least one rigid member connected to the first divider wall and the second divider wall.

5. The cargo organizer of claim 1 wherein the first divider wall and the second divider wall have a thickness that is less than a height of a recessed portion in the load floor such that the first divider wall and the second divider wall do not project above a load surface of the load floor when the first divider wall and the second divider wall are in the stowed position.

6. The cargo organizer of claim 1 wherein the first divider wall and the second divider wall include a trim layer positioned on a back surface of the first divider wall and the second divider wall, the trim layer facing upwards from the load floor when the first divider wall and the second divider wall are in the stowed position, the trim layer comprising a fabric material that is the same as a fabric material on the load floor.

7. The cargo organizer of claim 1 further comprising a hinge, the hinge connected to the load floor and including a shaft that is received in a sleeve in the first divider wall, the shaft rotatably connecting the first divider wall to the load floor.

8. The cargo organizer of claim 1 further comprising a net, the net connected to the linkage mechanism with a plurality of tethers, the net extending between the first divider wall and the second divider wall to limit movement of items stored in the storage compartment.

9. The cargo organizer of claim 1 further comprising a rigid support leg, the rigid support leg extending between the load floor and the first divider wall, the rigid support leg configured to prevent the first divider wall from moving from the deployed position to the stowed position.

10. The cargo organizer of claim 1 wherein the first divider wall includes a retention ring, the retention ring connected to the first divider wall in the storage compartment and configured to move from a folded position to an extended position to retain an item in the storage compartment.

11. The cargo organizer of claim 1 further comprising a third divider wall rotatably connected to the load floor and spaced apart from the second divider wall to define a second storage compartment, the linkage mechanism connected to the first divider wall, the second divider wall and the third divider wall to move the first divider wall, the second divider wall and the third divider wall from the stowed position to the deployed position when one of the first divider wall, the second divider wall and the third divider wall is moved from the stowed position to the deployed position.

12. The cargo organizer of claim 1 wherein the first divider wall includes a sleeve molded in a lower portion thereof, the sleeve configured to receive a shaft of a hinge mounted on the load floor to rotatably connect the first divider wall to the load floor.

13. The cargo organizer of claim 1 wherein the first divider wall includes at least one hook positioned in the storage compartment, the hook configured to limit movement of a bag secured thereon in the storage compartment.

14. A load floor configured to lay horizontally in a cargo area of a vehicle including the cargo organizer of claim 1.

15. The load floor of claim 14 including a recessed portion wherein the cargo organizer is connected inside the recessed portion.

16. A load floor configured to lay horizontally in a cargo area of a vehicle including two cargo organizers of claim 1 positioned adjacent to one another.

17. A cargo organizer for use on a load floor of a vehicle comprising:
    a first divider wall rotatably connected to the load floor;
    a second divider wall rotatably connected to the load floor and spaced apart from the first divider wall to define at least one storage compartment, the first divider wall and the second divider wall configured to operate in a stowed position and in a deployed position; and
    a linkage mechanism connected to the first divider wall and the second divider wall, the linkage mechanism configured to move the first divider wall and the second divider wall from the stowed position to the deployed position when one of the first divider wall and the second divider wall is moved from the stowed position to the deployed position; and
    a rigid support leg extending between the load floor and the first divider wall, wherein the rigid support leg is configured to prevent the first divider wall from moving from the deployed position to the stowed position, and
    wherein the support leg is an elongated bar rotatably connected to the load floor and removably connected to the first divider wall at a vertical location on a side wall of the first divider wall below the linkage mechanism.

* * * * *